(12) United States Patent
Ishikawa et al.

(10) Patent No.: US 7,071,451 B2
(45) Date of Patent: Jul. 4, 2006

(54) AUTOFOCUS SYSTEM AND MICROSCOPE

(75) Inventors: Aiichi Ishikawa, Kanagawa-ken (JP); Toshiaki Nihoshi, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 282 days.

(21) Appl. No.: 10/461,374

(22) Filed: Jun. 16, 2003

(65) Prior Publication Data

US 2004/0113043 A1    Jun. 17, 2004

(30) Foreign Application Priority Data

Jun. 14, 2002  (JP) ............................. 2002-174877
Mar. 27, 2003  (JP) ............................. 2003-087278

(51) Int. Cl.
    *G02B 27/40*    (2006.01)
(52) U.S. Cl. ............................. 250/201.4; 250/201.3; 359/383
(58) Field of Classification Search .. 250/201.2–201.4; 356/4.04, 4.05; 359/383, 368, 379
    See application file for complete search history.

(56) References Cited

U.S. PATENT DOCUMENTS

| | | | |
|---|---|---|---|
| 3,721,827 A | | 3/1973 | Reinheimer |
| 4,595,829 A | * | 6/1986 | Neumann et al. ........ 250/201.4 |
| 4,958,920 A | | 9/1990 | Jorgens et al. .............. 359/392 |
| 5,260,825 A | * | 11/1993 | Nagano et al. ............. 359/368 |
| 5,530,237 A | * | 6/1996 | Sato et al. ............... 250/201.4 |
| 6,760,154 B1 | * | 7/2004 | Focht ......................... 359/383 |

FOREIGN PATENT DOCUMENTS

| | | |
|---|---|---|
| JP | 2-59963 | 12/1990 |
| JP | 11-095091 | 4/1999 |
| JP | 2001-242375 | 9/2001 |

* cited by examiner

*Primary Examiner*—Thanh X. Luu
*Assistant Examiner*—Stephen Yam

(57) ABSTRACT

An autofocus system according to the present invention comprises: a light source; a focusing illumination optical system that forms an optical image generated with light from the light source on a target object through an objective lens; a focusing image forming optical system that receives through the objective lens reflected light generated as the optical image is reflected off the target object and forms a reflected image of the optical image; a photoelectric converter that is provided at an image forming position at which the reflected image is formed by the focusing image forming optical system to detect the reflected image; a signal output device that outputs a signal for controlling a focus actuator based upon a signal corresponding to the reflected image obtained at the photoelectric converter; and an image forming position adjustment device that adjusts an offset quantity between a focus position of the objective lens and an image forming position of the optical image by moving at least one of the image forming position of the optical image and the image forming position of the reflected image along an optical axis.

11 Claims, 7 Drawing Sheets

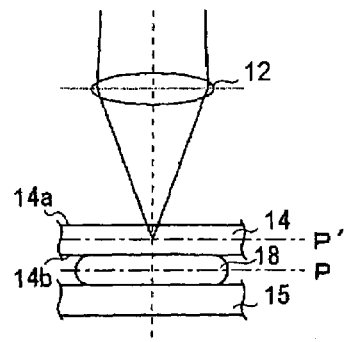
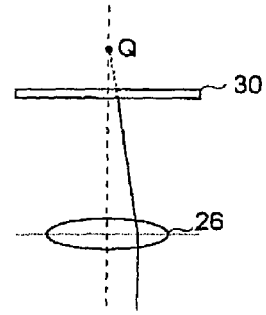
FIG.9A  FIG.9B
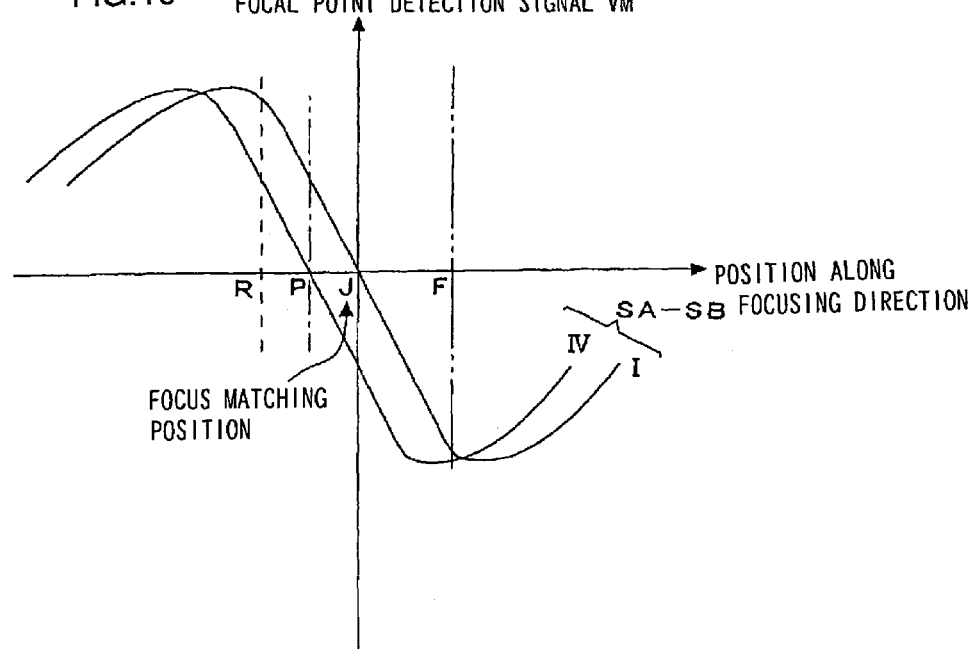
FIG.10

AUTOFOCUS SYSTEM AND MICROSCOPE

INCORPORATION BY REFERENCE

The disclosures of the following priority applications are herein incorporated by reference:
Japanese Patent Application No. 2002-174877 filed Jun. 14, 2002
Japanese Patent Application No. 2003-087278 filed Mar. 27, 2003

BACKGROUND OF THE INVENTION

1. Field of the Invention

The present invention relates to a technology to be adopted when implementing autofocus control in a microscope.

2. Description of the Related Art

Autofocus systems adopted in conjunction with microscopes in the known art include image contrast type autofocus systems. When observing a biological specimen in a fluid under fluorescent light with an optical microscope (a biological microscope), such an autofocus system detects the contrast of the fluorescent image and executes a focal adjustment in conformance to the position at which the maximum contrast is achieved.

However, there is a problem with image contrast type autofocus systems in that the contrast of the image of a specimen with a pale color cannot be extracted quickly and thus it takes a considerable length of time to execute the focal adjustment. Since fluorescent light fades quickly, when a specimen is observed under fluorescent light with a biological microscope the image may even disappear during the focusing process on the fluorescent image.

SUMMARY OF THE INVENTION

The present invention provides an autofocus system capable of adjusting any point in a specimen to the focal point of an objective lens with a high degree of reliability.

An autofocus system according to the present invention comprises: a light source; a focusing illumination optical system that forms an optical image generated with light from the light source on a target object through an objective lens; a focusing image forming optical system that receives through the objective lens reflected light generated as the optical image is reflected off the target object and forms a reflected image of the optical image; a photoelectric converter that is provided at an image forming position at which the reflected image is formed by the focusing image forming optical system to detect the reflected image; a signal output device that outputs a signal for controlling a focus actuator based upon a signal corresponding to the reflected image obtained at the photoelectric converter; and an image forming position adjustment device that adjusts an offset quantity between a focus position of the objective lens and an image forming position of the optical image by moving at least one of the image forming position of the optical image and the image forming position of the reflected image along an optical axis. It is preferable that the focusing illumination optical system includes a slit plate having a slit formed therein; and the light from the light source travels through the slit plate to form the optical image in a slit shape.

It is preferable that the image forming position adjustment device is provided on an optical path shared by the focusing illumination optical system and the focusing image forming optical system to move the image forming position of the optical image and the image forming position of the reflected image along the optical axis. The image forming position adjustment device may be provided on an optical path of the focusing illumination optical system to move the image forming position of the optical image along the optical axis. The image forming position adjustment device may also be provided on an optical path of the focusing image forming optical system to move the image forming position of the reflected image along the optical axis.

It is preferable that the image forming position adjustment device includes an adjustment lens provided on the optical path shared by the focusing illumination optical system and the focusing image forming optical system. The image forming position adjustment device may include an adjustment lens provided on the optical path of the focusing illumination optical system. The image forming position adjustment device may include an adjustment lens provided on the optical path of the focusing image forming optical system.

It is preferable that the image forming position adjustment device includes a lens position adjustment unit that adjusts a position of the adjustment lens along the optical axis of the focusing illumination optical system and the focusing image forming optical system. The image forming position adjustment device may include a lens position adjustment unit that adjusts the position of the adjustment lens along the optical axis of the focusing illumination optical system. The image forming position adjustment device may include a lens position adjustment unit that adjusts the position of the adjustment lens along the optical axis of the focusing image forming optical system.

It is preferable that the adjustment lens includes a convex lens and a concave lens, with one of the convex lens and the concave lens fixed on the optical axis of the focusing illumination optical system and the focusing image forming optical system and the other lens allowed to move along the optical axis of the focusing illumination optical system and the focusing image forming optical system. One of the convex lens and the concave lens may be fixed on the optical axis of the focusing illumination optical system and the other lens may be allowed to move along the optical axis of the focusing illumination optical system. One of the convex lens and the concave lens may be fixed on the optical axis of the focusing image forming optical system and the other lens may be allowed to move along the optical axis of the focusing image forming optical system.

It is preferable that the image forming position adjustment device further includes a lens exchange unit that exchanges adjustment lenses.

A microscope according to the present invention comprises: an autofocus system according to claim 1; and an observation optical system that includes the objective lens.

An autofocus control method according to the present invention forms an optical image generated with light emitted from a light source onto a target object through an objective lens; forms a reflected image of the optical image that is reflected by the target object and passes through the objective lens; separates a focus position of the objective lens from an image forming position of the optical image by moving at least one of the image forming position of the optical image and an image forming position of the reflected image along an optical axis; executes a photoelectric conversion of the reflected image having been formed; and controls a focus actuator based upon a photoelectrically converted signal of the reflected image.

BRIEF DESCRIPTION OF THE DRAWINGS

FIG. 9A shows the focus position of the autofocusing slit image, offset by the focus position adjustment lens;

FIG. 9B shows the state of the reflected image of the slit image shown in FIG. 9A; and FIG. 10 shows the focal point detection signal output to the stage drive DC motor after the focus position adjustment lens is moved.

DESCRIPTION OF THE PREFERRED EMBODIMENT

An embodiment of the present invention is now explained in reference to the drawings.

The autofocus system achieved in the embodiment of the present invention executes a focal adjustment through slit projection. A slit projection-type autofocus system irradiates slit illumination light onto a specimen and positions the specimen at the focal point of an objective lens by using reflected light from the specimen. The following is a brief explanation of the focal adjustment achieved in the slit projection-type autofocus system.

Slit illumination light is generated by passing light emitted from an auxiliary light source such as a light emitting diode (LED) through a slit. The slit illumination light is divided into two separate beams along the central line extending in the lengthwise direction. One of the illumination light beams is blocked, whereas the other illumination light beam is condensed through the objective lens and is irradiated onto an observation target object. The illumination light beam condensed and irradiated on the target object is then reflected off the surface of the target object, travels through the objective lens and forms an image at the image capturing surface of a photoelectric converter such as a CCD sensor. The photoelectric converter detects focal point information from the image formed at the image capturing surface with the reflected light. The focal point information detected at the photoelectric converter is constituted of the relative distance between the focus position of the slit illumination light, i.e., the focus position of the slit image and the focus matching position of the objective lens.

Figure 8:
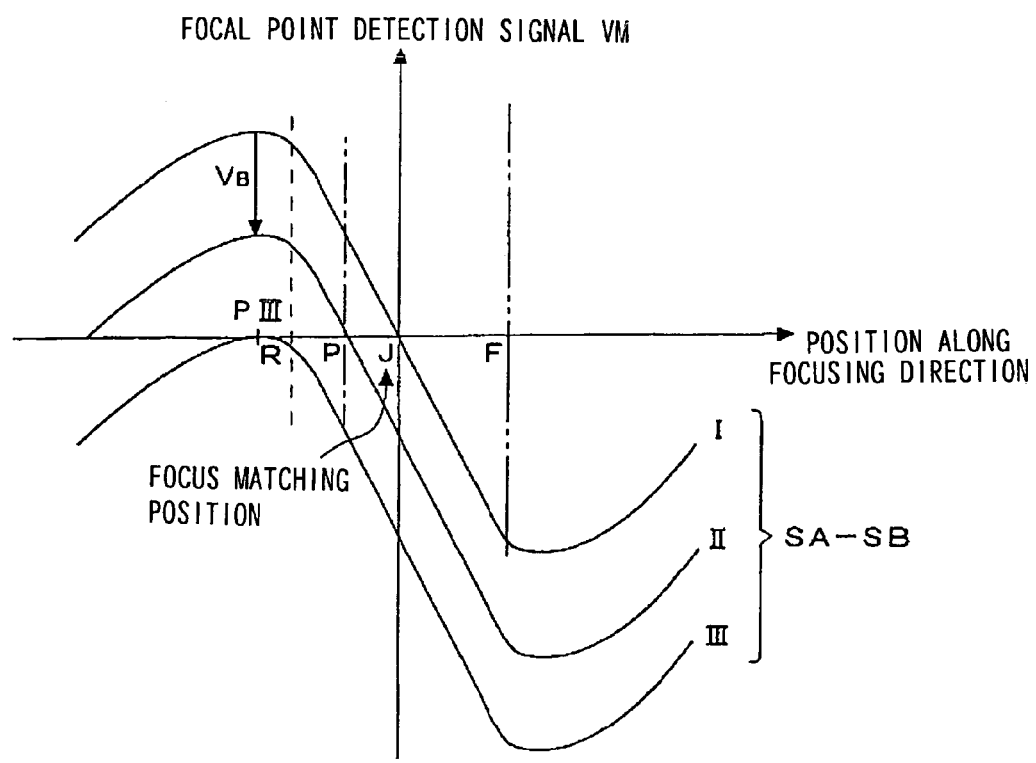
FIG. 8 presents an example of a relationship that may be achieved between the focus position of the reflected image of the slit image formed at the autofocusing CCD sensor and the focal point detection signal output to the stage drive DC motor.

Based upon the focal point information thus detected, the autofocus system outputs a control signal to be used to move, for instance, a stage on which the target object is placed along the optical axis. The position of the stage is moved along the optical axis in conformance to the control signal and thus, autofocus control is implemented through an adjustment of the distance between the objective lens and the target object. Graph I in FIG. 8 is an example of the control signal used to implement the autofocus control. It is to be noted that FIG. 8 shows the relationship between the relative distance from the focus matching position J of the objective lens to the slit image and the focal point detection signal VM applied to a DC motor which drives the stage.

The slit projection-type autofocus system, which achieves an advantage in that the focal adjustment is executed quickly, is widely used in industrial microscopes employed to observe, for instance, surfaces of semiconductor substrates. Now, an application of the slit projection-type autofocus system explained above in an optical microscope (a biological microscope) used to observe a biological specimen is considered.

When observing a biological specimen in a fluid placed between a slide glass and a cover glass through a biological microscope, it is difficult to ensure that the slit illumination light generated in the slit projection-type autofocus system is reflected at an arbitrary position in the fluid. Accordingly, with the autofocus system, the focus is first adjusted at the boundary surface having a higher reflectance between the cover glass and the specimen. Then, the position of the portion of the specimen in the fluid to be observed is adjusted to the focus position of the objective lens by moving the stage.

The position of the portion to be actually observed, i.e., the inside of the specimen, may be adjusted to the focal point of the objective lens by moving the specimen while implementing autofocus control through the following method. A DC voltage VB is added to the focal point detection signal VM applied to the DC motor which drives the stage having the specimen placed thereupon so that the position of the stage set through the autofocus control is moved along the optical axis. For instance, if the focal point is to be adjusted to a point P inside the specimen in a state in which the focal point of the objective lens is currently adjusted at the boundary surface between the cover glass and the specimen, a DC voltage VB is added so that the value of the focal point detection signal VM is set to 0 at the point P, as shown in Graph II in FIG. 8. By using the focal point detection signal VM having the DC voltage VB added thereto, the position of the stage along the optical axis can be controlled.

However, when the stage is moved along the optical axis by applying the DC voltage VB, the stage is allowed to move only within the range over which the focal point detection signal VM is present. The area over which the focal point detection signal VM is present does not range beyond Graph III shown in FIG. 8 at which the graph of the focal point detection signal VM intersects the horizontal axis. Thus, the autofocus control cannot be implemented if the graph obtained by adding the DC voltage VB to Graph I is set beyond Graph III. As a result, the stage is only allowed to move through the application of the DC voltage VB within the range between the focus matching position J and the point PIII at which Graph III and the horizontal axis meet in FIG. 8. When the quantity of slit illumination light that is reflected is significant, the level of the focal point detection signal VM is high, and thus, the stage is allowed to move over a wide range.

However, when observing a biological specimen in a fluid, the refractive index of the cover glass and the refractive index of the fluid in which the specimen is immersed are close to each other and the reflectance at the boundary surface between the cover glass and the specimen is extremely low. As a result, only a small quantity of reflected light is generated by irradiating the slit illumination light and the level of the focal point detection signal VM is low. In such a case, the range over which the focus position having been set to the boundary surface can be adjusted by adding the DC voltage VB, i.e., the range between Graph I and Graph III in FIG. 8, is smaller than the focus position adjustment range required in the actual observation. For this reason, it is considered impossible to move the stage along the optical axis while implementing autofocus control by using the DC voltage VB as explained above in order to move the focus position of the objective lens to the position of an internal portion of the specimen which the user wishes to observe with a biological microscope.

Accordingly, instead of electrically shifting the focus position of the objective lens, the focus position is optically shifted by using a focus position adjustment lens to be detailed later, in the embodiment of the present invention. The following is a detailed explanation of an autofocus control device achieved in the embodiment of the present invention.

First, a microscope equipped with an autofocus system achieved in the embodiment of the present invention is explained in reference to the drawings. The microscope to be explained in reference to the embodiment is an upright microscope having an immersion objective lens.

Figure 1:
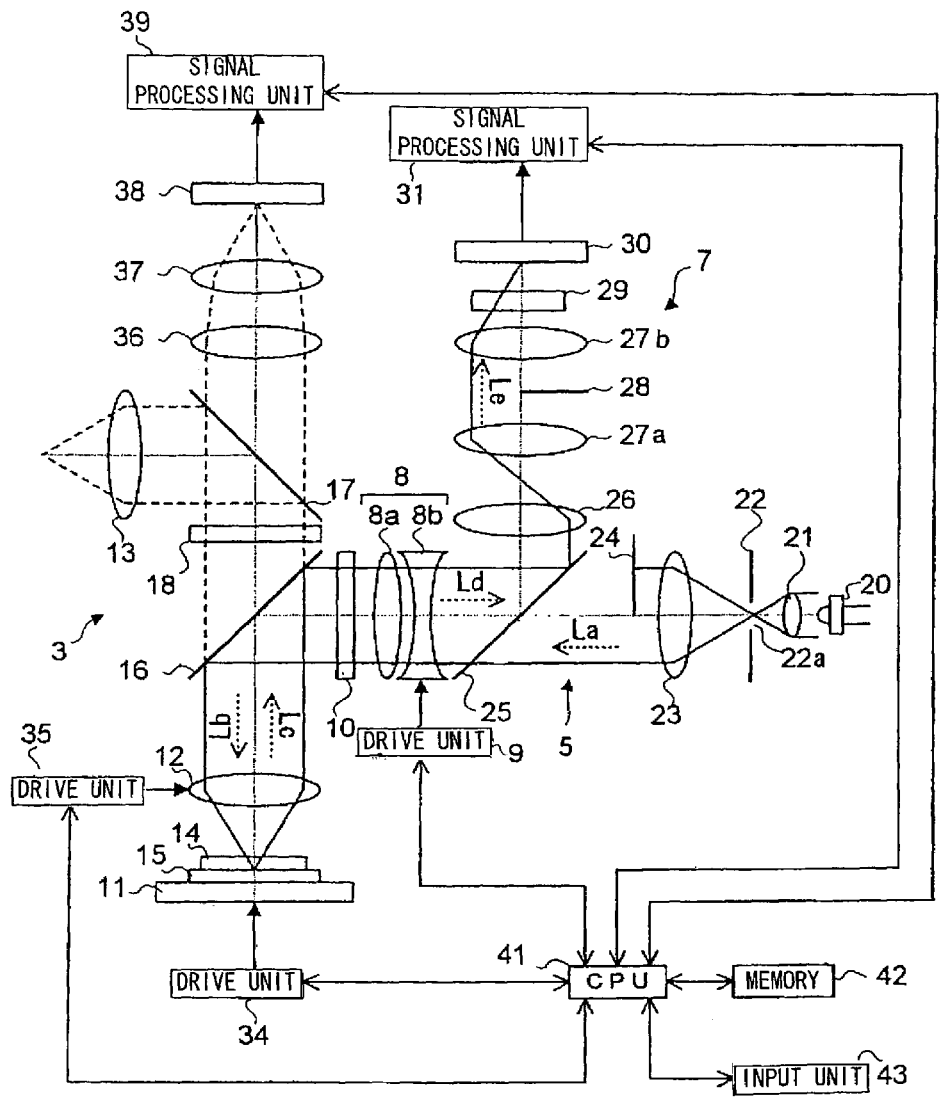
FIG. 1 schematically illustrates the structures adopted in the optical systems and the control system of a microscope achieved in an embodiment of the present invention.
Figure 3:
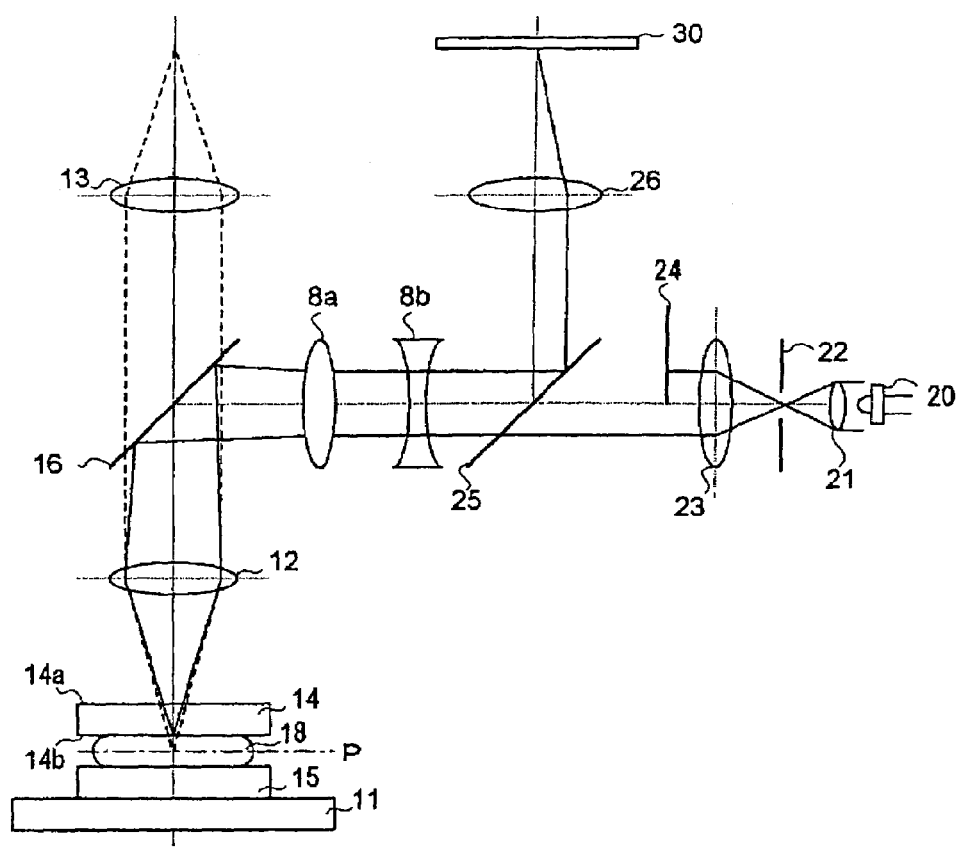
FIG. 3 schematically illustrates a state in which the focus matching position is adjusted through the focus position adjustment lens.

The microscope shown in FIG. 1 is used to observe a specimen, i.e., an observation target object, by forming an enlarged image of the specimen. As shown in FIG. 3, a specimen 18 to be observed, which is immersed in a medium such as water, is set between a cover glass 14 and a slide glass 15 and is placed on a stage 11. A boundary surface of the cover glass 14 and the medium in which the specimen 18 is immersed is referred to as a specimen surface 14*b*.

First, the optical systems provided in the microscope are explained. The microscope in the embodiment of the present invention comprises an observation optical system 3 provided above the specimen 18, a focusing illumination optical system 5 and a focusing image forming optical system 7 provided to a side of the observation optical system 3. The focusing illumination optical system 5 and the focusing image forming optical system 7 constitute optical systems of the autofocus system.

The focusing illumination optical system 5 is now explained. The focusing illumination optical system 5 includes an LED light source 20, a first collector lens 21, a slit plate 22, a second collector lens 23, a first pupil restricting mask 24, a first half-mirror 25, a focus position adjustment lens 8 and a visible light cut filter 10. These optical members are sequentially disposed on the optical axis of the focusing illumination optical system 5. A narrow rectangular slit opening 22*a* is formed at the center of the slit plate 22. The slit plate 22 is set so that the center of the slit opening 22*a* is set at the optical axis and the longer side of the slit opening 22*a* extends along a direction perpendicular to the drawing sheet on which FIG. 1 is presented.

Infrared light (near infrared light) emitted from the LED light source 20 is condensed at the first collector lens 21 and the condensed light then enters the slit plate 22. The light travels through the slit opening 22*a* of the slit plate 22 set at a position that is conjugate with the position of the specimen surface 14*b* (see FIG. 3). The infrared light having passed through the slit opening 22*a* is converted to parallel light at the second collector lens 23 and is irradiated onto the first pupil restricting mask 24.

The first pupil restricting mask 24, which is centered around the optical axis, shields half of the pupil from light. More specifically, the first pupil restricting mask 24 is set so as to block half of the slit infrared light along the central line extending along the length of the slit infrared light. Infrared light La having passed through the first pupil restricting mask 24 is transmitted through the first half-mirror 25. The first half-mirror 25 reflects part of the infrared light and allows the rest of the infrared light to be transmitted. It is to be noted that the first half-mirror 25, which is provided at an intersecting point of the optical axes of the focusing illumination optical system 5 and the focusing image forming optical system 7, is also utilized in the focusing image forming optical system 7 as explained later. The infrared light La having been transmitted through the first half-mirror 25 is then transmitted through the focus position adjustment lens 8, and the visible light component contained in the infrared light La is removed at the visible light cut filter 10.

A dichroic mirror 16 is provided at an intersecting point of the optical axes of the focusing illumination optical system 5 and the observation optical system 3. As explained later, the dichroic mirror 16 is utilized in the observation optical system 3 as well. The dichroic mirror 16, which is set to constitute an afocal system on the observation optical path of the observation optical system 3, reflects infrared light and allows visible light to be transmitted.

The infrared light having passed through the visible light cut filter 10 is reflected by the dichroic mirror 16 to advance downward, i.e., toward the specimen 18. Infrared light Lb reflected by the dichroic mirror 16 is condensed at a first objective lens 12 and is irradiated onto the specimen 18. It is to be noted that the first objective lens 12 is also utilized in the observation optical system 3 as detailed later. In addition, details of the focus position adjustment lens 8 are to be provided later.

The observation optical system 3 includes the first objective lens 12, the dichroic mirror 16, an infrared light cut filter 18, a second half-mirror 17 and an eyepiece second objective lens 13. These optical members are disposed sequentially, starting on the side toward the specimen 18. In addition, the observation optical system 3 includes an eyepiece lens provided beyond the eyepiece second objective lens 13.

The specimen 18 placed on the stage 11 is illuminated by an illumination device. The illumination device that illuminates the specimen 18 may be a transmission-type illumination device provided under the stage 11 or an epi-illumination device provided above the stage 11. Visible light emitted from the illumination device is transmitted through the specimen 18, whereupon it becomes observation light which then passes through the first objective lens 12 and is transmitted through the dichroic mirror 16. Subsequently, the observation light enters the second half-mirror 17 after the infrared light contained therein is removed at the infrared light cut filter 18. At the second half-mirror 17, part of the observation light is reflected, whereas the rest of the observation light is transmitted. The observation light having entered the second half-mirror 17 and been reflected at the second half-mirror 17 forms an observation image of the specimen through the eyepiece second objective lens 13 and the eyepiece lens, and this observation image is observed.

It is to be noted that the part of the observation light that has been transmitted through the second half-mirror 17 then passes through a camera second objective lens 36 and a camera relay lens 37, and forms an image at an image capturing surface of a camera CCD sensor 38. The image formed at the image capturing surface of the camera CCD sensor 38 in this manner may be processed at a camera signal processing unit 39 so as to use the image of the specimen 18 by projecting it onto a monitor.

Next, the focusing image forming optical system 7 is explained. The focusing image forming optical system 7 receives the slit infrared light that has been irradiated by the focusing illumination optical system 5 described earlier onto the specimen 18 placed on the stage 11 and has been reflected off the specimen. The infrared light having formed the image through the first objective lens 12 is reflected at the surface of the cover glass 14 and at the boundary surface (specimen surface) 14b of the cover glass 14 and the specimen, since the specimen 18 on the stage 11 is covered by the cover glass 14.

The infrared light having been reflected off the cover glass 14, the specimen surface 14b and the like is then converted to parallel light at the first objective lens 12. The infrared light converted to parallel infrared light Lc at the first objective lens 12 is reflected at the dichroic mirror 16 and further passes through the visible light cut filter 10 and the focus position adjustment lens 8. The infrared light Ld having passed through the focus position adjustment lens 8 enters the first half-mirror 25.

Part of the infrared light Ld having entered the first half-mirror 25 is reflected upward and enters the focusing image forming optical system 7. The focusing image forming optical system 7 includes the first half-mirror 25, an autofocusing second objective lens 26, an autofocusing relay lens 27a, a second pupil restricting mask 28, an autofocusing relay lens 27b, a cylindrical lens 29 and an autofocusing CCD sensor 30. These optical members are sequentially disposed on the optical axis.

The infrared light having been reflected at the first half-mirror 25 and having entered the focusing image forming optical system 7 is condensed at the autofocusing second objective lens 26, and is converted to image forming light to form a slit image. The slit image (infrared light Le) formed by the autofocusing second objective lens 26 is relayed through the autofocusing relay lenses 27a and 27b. The infrared light Le travels through the cylindrical lens 29 and enters the autofocusing CCD sensor 30 to reform the slit image at an image capturing surface of the autofocusing CCD sensor 30.

It is to be noted that the second pupil restricting mask 28 provided between the autofocusing relay lenses 27a and 27b is set so as to shield half of the pupil from the light. The area that is shielded from the light by the second pupil restricting mask 28 corresponds to the area shielded from the light by the first pupil restricting mask 24 of the focusing illumination optical system 5 explained earlier. The cylindrical lens 29 is a lens that refracts light only along a predetermined direction. Through the cylindrical lens 29 the infrared light Le is compressed along the direction perpendicular to the drawing sheet on which FIG. 1 is presented, i.e., along the longer side of the slit image and the slit image is formed at the image capturing surface of the autofocusing CCD sensor 30. The autofocusing CCD sensor 30 maybe constituted of a line sensor having a plurality of light receiving portions arranged in a one-dimensional array or an area sensor having two-dimensionally arrayed light receiving portions.

As described above, the focusing illumination optical system 5 irradiates onto the specimen 18 the image of the slit opening 22a formed as a slit, which is obtained by allowing the light emitted from the LED light source 20 to pass through the slit opening 22a at the slit plate 22. It irradiates the slit light instead of spot light, since spot light irradiated onto the specimen 18 and reflected off an uneven specimen surface 14b or the like becomes scattered and thus ideal signals cannot be obtained. However, the slit plate 22 may be omitted depending upon the state of the specimen surface 14b or the like. In such a case, too, an image of the LED light source 20 is irradiated on the specimen 18 to implement autofocus control as described above. In addition, the first collector lens 21 may be omitted.

The focus position adjustment lens 8 used in the autofocus system according to the present invention is now explained. As shown in FIG. 1, the focus position adjustment lens 8 is provided between the dichroic mirror 16 and the first half-mirror 25. Namely, the focus position adjustment lens 8 is positioned on the optical path shared by the focusing illumination optical system 5 and the focusing image forming optical system 7 to constitute an afocal system. The focus position adjustment lens 8 includes a convex lens 8a and a concave lens 8b. A focus position adjustment lens drive unit 9 is connected to the focus position adjustment lens 8. The focus position adjustment lens drive unit 9 is constituted with a focus position adjustment lens DC motor that allows the focus position adjustment lens 8 to travel back and forth along the optical axis and an electrically driven focus position adjustment lens turret that allows a plurality of focus position adjustment lenses with different magnification powers to be used interchangeably.

A focus position adjustment operation switch operated to move the focus position adjustment lens 8 along the optical axis and a focus position adjustment lens changeover switch are provided at an input unit 43 of the microscope. The observer can move the focus position adjustment lens 8 back and forth along the optical axis by operating the focus position adjustment operation switch. In addition, the observer can select any focus position adjustment lens 8 among the plurality of focus position adjustment lenses 8 mounted at the electrically driven focus position adjustment lens turret by operating the focus position adjustment lens changeover switch.

The operation of the focus position adjustment lens 8 is now explained in reference to FIGS. 2A through 2C and 3. It is to be noted that FIGS. 2A through 2C and 3 only show the components referred to in the explanation. In the illustrations presented in FIGS. 2A through 2C, the specimen surface 14b, the first objective lens 12 and the focus position adjustment lens 8 are shown in a single row for simplification. In addition, in FIGS. 2A through 2C and 3, a solid line represents autofocusing illumination light and a dotted line represents observation light.

The focus position adjustment lens 8, i.e., the convex lens 8a and the concave lens 8b, shifts the image forming position of the slit image formed with the autofocusing illumination light condensed and irradiated onto the specimen 18 through the first objective lens 12 along the optical axis. At the same time, the focus position adjustment lens 8 shifts along the optical axis the image forming position of the reflected slit image reformed at the image capturing surface of the autofocusing CCD sensor 30 with the autofocusing illumination light reflected off the specimen 18. By shifting the image forming position of the slit image formed with the illumination light irradiated on the specimen 18 and the image forming position of the reflected slit image formed at the image capturing surface of the CCD sensor 30 in this manner, the focus position adjustment lens 8 matches the focus position of the first objective lens 12 with the position within the specimen 18 which the observer wishes to observe while implementing autofocus control.

Next, a method adopted to adjust the focal point of the first objective lens 12 to the position of the specimen 18 to be actually observed while implementing the autofocus control with the focus position adjustment lens 8 is explained.

Either the convex lens 8a or the concave lens 8b of the focus position adjustment lens 8 is fixed on the optical axis whereas the other lens is allowed to move along the optical axis. In this example, the convex lens 8a is fixed on the side toward the specimen 18 and the concave lens 8b is set further rearward, i.e., on the side toward the light source 20 of the focusing illumination optical system 5 so as to be allowed to move along the optical axis. It is to be noted that both the convex lens 8a and the concave lens 8b may be allowed to move along the optical axis, instead.

Figure 2A:
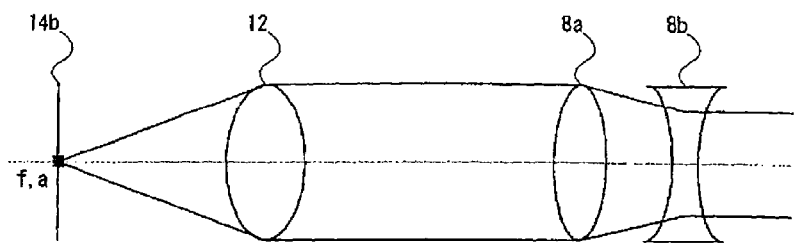
FIG. 2A shows the focal point of the slit image and the focal point of the objective lens when the offset quantity is 0.

First, while the focal point f of the first objective lens 12 is set at the boundary surface of the cover glass 14 and the specimen 18, i.e., at the specimen surface 14b, the position of the concave lens 8b of the focus position adjustment lens 8 is adjusted so as to match the focal point a of the autofocusing slit image irradiated onto the specimen 18 through the slit opening 22a with the specimen surface 14b, as shown in FIG. 2A. At this time, the focal point of the reflected slit image, too, is set onto the image capturing surface of the autofocusing CCD sensor 30. The position indicated in FIG. 2A is referred to as an "offset zero position" achieved for the slit image by the focus position adjustment lens 8.

FIG. 2A shows a state in which the slit image is formed at the focal point of the first objective lens 12, i.e., at the specimen surface 14b, and the reflected slit image is formed at the image capturing surface of the autofocusing CCD sensor 30. In this state, the focus position adjustment lens 8 simply functions as a telephoto system and thus, the autofocusing illumination light before passing the focus position adjustment lens 8 and the autofocusing illumination light after passing through the focus position adjustment lens 8 are both constituted of parallel light beams. Through the autofocus control implemented as detailed later under these circumstances, the position of the stage 11 is controlled so as to keep the focal point f of the first objective lens 12 adjusted at the specimen surface 14b at all times.

Figure 2B:
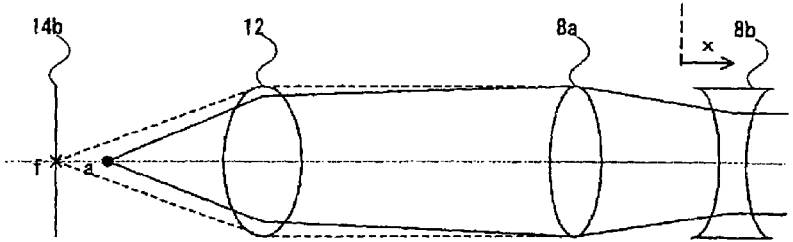
FIG. 2B shows the focal point of the slit image and the focal point of the objective lens after the focus position adjustment lens is moved.

Next, the concave lens 8b of the focus position adjustment lens 8 is moved back and forth along the optical axis, thereby moving the autofocusing slit image. As a result, the image forming position a of the autofocusing slit image and the focal point f of the first objective lens 12 become offset relative to or separated from each other. For instance, the concave lens 8b may be caused to move backward, i.e., to move further away from the convex lens 8a, by a distance x, as shown in FIG. 2B. As a result, the focal point a of the autofocusing slit image moves over a predetermined distance or extent, i.e., an "offset quantity OS", from the specimen surface 14b toward the first objective lens 12.

Figure 2C:
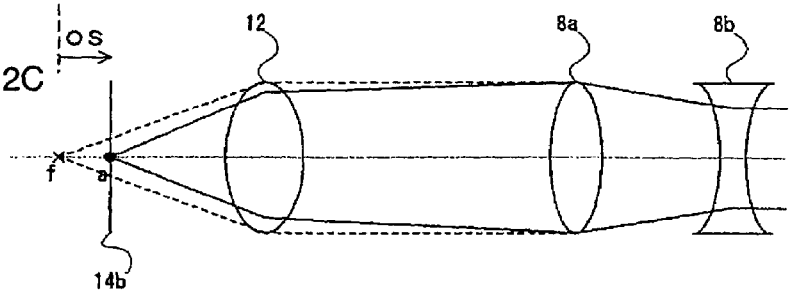
FIG. 2C shows the focal point of the slit image and the focal point of the objective lens after the focus matching position is adjusted.

As the autofocus control is implemented in the state shown in FIG. 2B, the stage 11 moves along the optical axis causing the specimen surface 14b to move. Thus, the focal point a of the autofocusing slit image is set exactly to the specimen surface 14b, as shown in FIG. 2C. As a result, the focal point f of the first objective lens 12 is displaced from the specimen surface 14b by the offset quantity OS further into the specimen 18. Accordingly, by setting the distance x over which the concave lens 8b moves and the offset quantity OS to appropriate values, the focal point f of the objective lens 12 can be set exactly at a point P within the specimen 18, as shown in FIG. 3.

The distance x over which the concave lens 8b constituting the focus position adjustment lens 8 moves and the offset quantity OS by which the focal point f is offset or shifted from the specimen surface 14b are determined in conformance to the magnifying power (the focal length) of the first objective lens 12. Considering the likely structure of the specimen, the offset quantity OS that needs to be achieved in the microscope system will be approximately 50 µm.

The reflectance at the upper surface 14a of the cover glass 14 used in conjunction with the immersion objective lens in the embodiment is approximately 0 if the medium in which the immersion objective lens is immersed is oil. The reflectance at the cover glass upper surface 14a matches the reflectance at the cover glass lower surface, i.e., at the specimen surface 14b, if the medium is water. An immersion objective lens normally has a high magnifying power of 40 or more and a large numerical aperture, and the focal depth on the side toward the specimen 18 is extremely small. For this reason, a reflection at the cover glass upper surface 14a does not interfere with the autofocus control.

The autofocus system achieved in the embodiment of the present invention may also be adopted in conjunction with a more standard so-called dry objective lens. However, in the case of a dry objective lens, the reflectance at the cover glass upper surface is at least 10 times the reflectance at the lower surface and the focal depth is relatively large. For this reason, the cover glass lower surface 14b cannot easily be used as the autofocus reference surface as in the case of the immersion objective lens. Accordingly, the cover glass upper surface at which a signal achieving a level at least 10 times as high as that at the cover glass lower surface should be used as the autofocus reference surface. In such a case, the offset quantity OS is bound to be much larger than the offset quantity OS, e.g., 50 µm, set in conjunction with the immersion objective lens with a high magnifying power. The offset quantity OS may be set to, for instance, 170 µm (the cover glass thickness)+50 µm when a dry objective lens is used. It is to be noted that the offset quantity can be set to a large enough value to allow the cover glass upper surface to be used for reference by selecting an appropriate focus position adjustment lens 8.

As explained above, by constituting the focus position adjustment lens 8 with the convex lens 8a and the concave lens 8b and providing the focus position adjustment lens 8 in an autofocus system which is commonly used, the image forming position of the autofocusing illumination light and the focus position of the first objective lens 12 can be offset relative to or separated from each other through a simple structure.

It is to be noted that the distance by which the image forming position of the autofocusing illumination light can be separated from the focus position of the first objective lens 12 with the focus position adjustment lens 8, i.e., the offset quantity OS, is physically restricted in conformance to the focal length of the focus position adjustment lens 8. Accordingly, by exchanging the focus position adjustment lens 8 itself with another focus position adjustment lens 8, the offset quantity OS can be altered. For instance, by setting a lens with a large focal length on the optical axis, the offset quantity OS can be lengthened. When the focus position adjustment lens 8 has been replaced with a lens with a different focal length, the position of the focus position adjustment lens 8 must be adjusted in order to determine the offset zero position. It is to be noted that as explained earlier, the focus position adjustment lens 8 can be replaced by operating the focus position adjustment lens changeover switch at the input unit 43.

The focus position adjustment lens 8 is provided between the dichroic mirror 16 and the first half-mirror 25, i.e., on the optical path shared by the focusing illumination optical system 5 and the focusing image forming optical system 7, as shown in FIG. 1. The focus position adjustment lens 8 set at such a position shifts both the focus position of the slit image condensed and irradiated on the specimen 18 and the focus position of the reflected slit image reformed at the image capturing surface of the autofocusing CCD sensor 30 with the light reflected off the specimen surface 14b of the specimen 18 along the optical axis. However, the focus position adjustment lens 8 does not need to be set at the exact position indicated in FIG. 1 as long as it can be used to separate the focus position of the first objective lens 12 from the image forming position of the slit image so as to set the focus position of the first objective lens 12 at a desired point while implementing the autofocus control.

Figure 4:
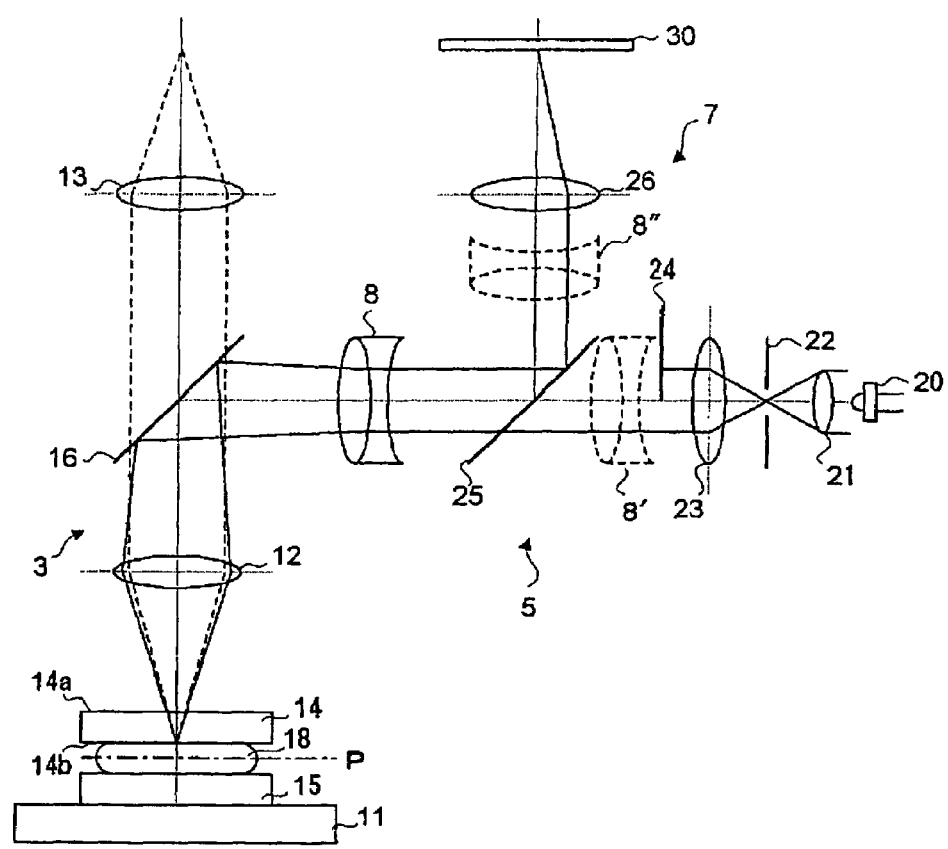
FIG. 4 schematically shows another position that may be assumed by the focus position adjustment lens.

For instance, a focus position adjustment lens 8' may be provided at the focusing illumination optical system 5 between the first half-mirror 25 and the first pupil restricting mask 24 as indicated by the dotted line in FIG. 4. In this case, the focus position adjustment lens 8' shifts the focus position of the slit image condensed and irradiated onto the specimen 18 along the optical axis. Alternatively, a focus position adjustment lens 8" may be provided at the focusing image forming optical system 7 between the first half-mirror 25 and the autofocusing second objective lens 26 as indicated by another dotted line in FIG. 4. In this case, the focus position adjustment lens 8" shifts the focus position of the reflected slit image reformed at the image capturing surface of the autofocusing CCD sensor 30 along the optical axis.

Next, the control system of the microscope is explained. The control system of the microscope comprises an autofocusing signal processing unit 31 utilized for focus position detection, a stage drive unit 34 that moves the stage 11 up and down, a motorized nosepiece drive unit 35 that drives a motorized nosepiece to exchange the first objective lens 12 with another objective lens, a CPU 41, a memory 42, the input unit 43 and the like. The CPU 41 controls the autofocusing signal processing unit 31, the stage drive unit 34, the motorized nosepiece drive unit 35 and the focus position adjustment lens drive unit 9 which has been explained earlier.

Now, the processing procedure of the slit projection type autofocus control executed at the CPU 41 is explained.

The signals of the slit image detected by the autofocusing CCD sensor 30 are output to the autofocusing signal processing unit 31. The CPU 41 detects focal point information indicating the focus state of the first objective lens 12 with respect to the specimen 18 by processing the signals of the slit image output to the autofocusing signal processing unit 31. The CPU 41 outputs a signal indicating the focal point information to the stage drive unit 34. The stage drive unit 34 moves the position of the stage 11 up or down along the optical axis in conformance to the signal input thereto to position the specimen 18 at the focal point of the first objective lens 12.

The position at the image capturing surface of the autofocusing CCD sensor 30, at which the reflected slit image is formed, moves along the direction in which the shorter side of the reflected slit image extends as the stage 11 moves up or down along the optical axis and the positions of the specimen 18 and the cover glass 14 thus change. Based upon the position of the reflected image at the image capturing surface of the CCD sensor 30, the CPU 41 obtains through calculation an autofocusing control signal to be used to control the movement of the stage 11. The following is an explanation of the method adopted to calculate the control signal based upon the signals of the reflected image formed at the image capturing surface of the autofocusing CCD sensor 30.

Figure 5:
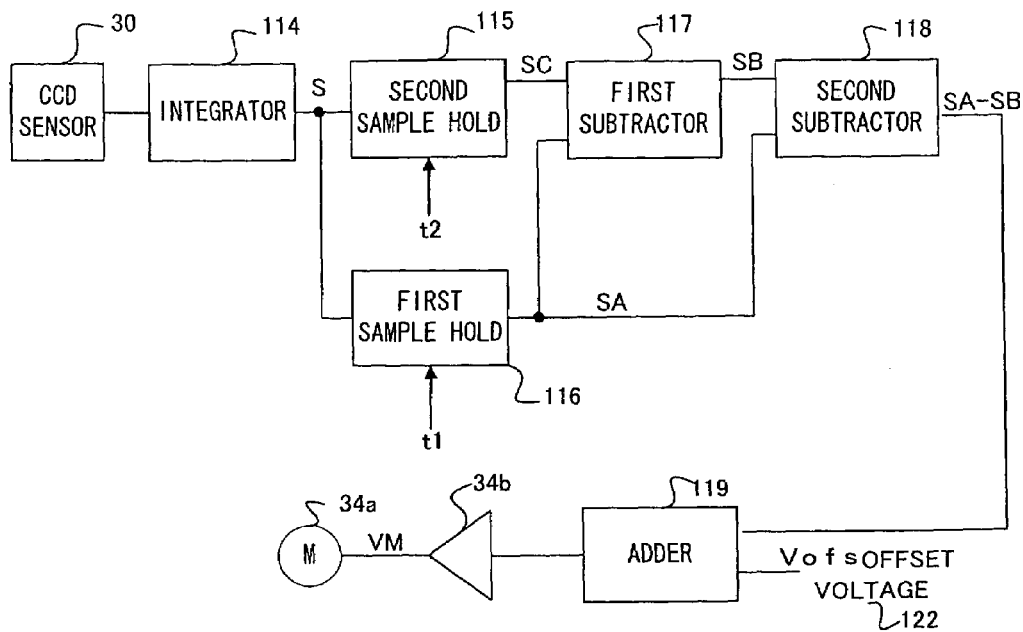
FIG. 5 is a block diagram of the autofocus control.
Figure 6:
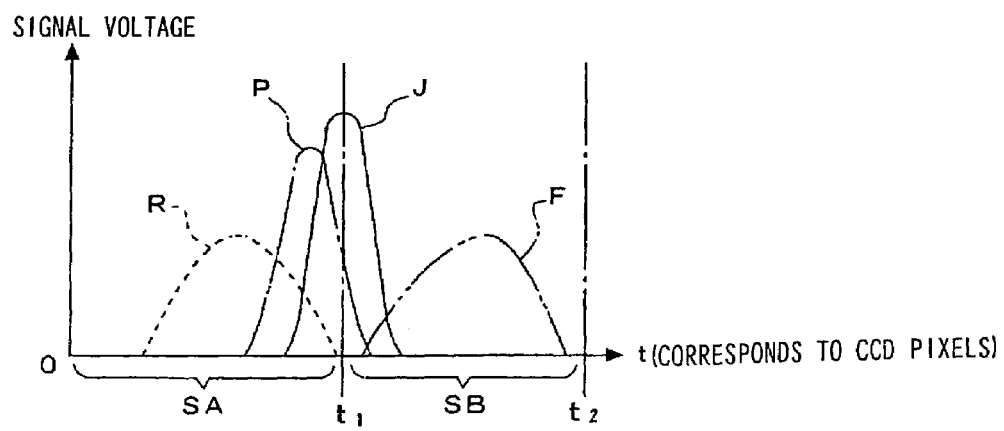
FIG. 6 shows the states of the slit image signals at the autofocusing CCD sensor.

FIG. 5 is a block diagram of the autofocus control and FIG. 6 shows varying states of reflected image signals detected at the autofocusing CCD sensor 30. The autofocus control processing shown in FIG. 5 is executed at the CPU 41.

The autofocusing CCD sensor 30 is constituted of a plurality of light receiving portions, and the outputs from the individual light receiving portions are sequentially scanned along the image capturing surface. In order to simplify the explanation, it is assumed that the CCD sensor 30 is constituted of a line sensor and that the outputs are scanned sequentially from one end of the line sensor. The individual pixels disposed at varying positions to constitute the CCD sensor 30 are indicated along the horizontal axis and the signal voltages detected by the CCD sensor 30 are indicated along the vertical axis in FIG. 6. In FIG. 6, the scanning start position, i.e., one end of the autofocusing CCD sensor 30, is set at t=0, the scanning middle point is set at t=t1 and the scanning end position, i.e., the other end of the autofocusing CCD sensor 30, is set at t=t2. The 2-point chain line F represents signals of the reflected slit image formed with the autofocusing illumination light frontward relative to the autofocusing CCD sensor 30, the dotted line R represents signals of the reflected slit image formed rearward relative to the autofocusing CCD sensor 30 and the solid line J represents signals of the reflected slit image formed at the image capturing surface of the autofocusing CCD sensor 30 in FIG. 6.

Figure 7:
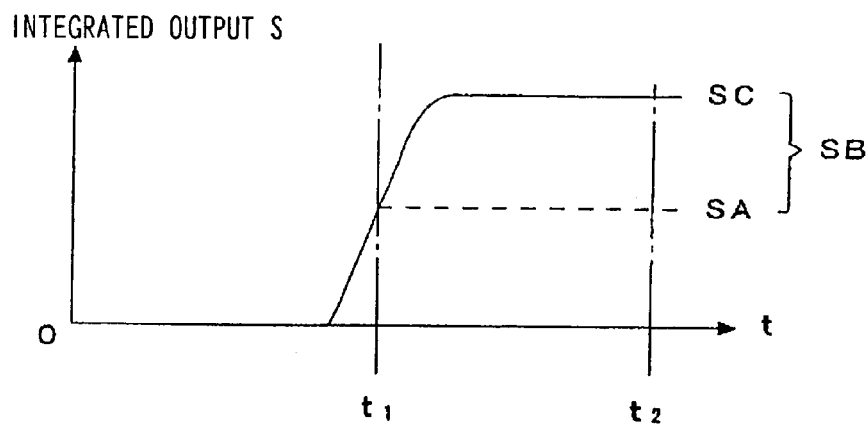
FIG. 7 shows the output signal from the integrator.

As shown in FIG. 5, the results of scanning the reflected slit image having been detected at the autofocusing CCD sensor 30 and having been processed at the autofocusing signal processing unit 31 are input to an integrator 114. The integrator 114 sequentially integrates the signals of the reflected image input thereto. FIG. 7 shows an output signal S from the integrator 114. The horizontal axis in FIG. 7 corresponds to the horizontal axis in FIG. 6. As shown in FIG. 7, the output signal S from the integrator 114 is sampled and held by a first sample hold 116 at the position t1, i.e., at the middle point of the CCD sensor 30. The output signal S held at the sample hold 116 is indicated as SA in FIG. 7. The integrator 114 further integrates the signals provided by the CCD sensor 30, and the output signal S from the integrator 114 is sampled and held by a second sample hold 115 at the trailing end t2 of the CCD sensor 30. The output signal S held at the second sample hold 115 is indicated as SC in FIG. 7.

A first subtractor 117 executes a subtraction by using the output SA from the first sample hold 116 and the output SC from the second sample hold 115 and thus obtains an output SB. A second subtractor 118 subtracts the output SB provided by the first subtractor 117 from the output SA provided by the first sample hold 116 and thus obtains an output SA−SB. An adder 119 calculates a focal point detection signal VM to be used as a control signal by adding an offset voltage Vofs 122 to the value of the output SA−SB obtained at the second subtractor 118.

The focal point detection signal VM is output to a stage drive motor driver 34b of the stage drive unit 34. The stage drive motor driver 34b applies the focal point detection signal VM to a stage drive DC motor 34a that moves the stage 11 up/down along the optical axis. In conformance to the focal point detection signal VM, the stage drive DC motor 34a is driven so as to set the output SA−SB to 0.

FIG. 10 shows graphs of the focal point detection signal VM. The focal point detection signal VM is indicated along the vertical axis and the position of the reflected slit image formed at the CCD sensor 30 along a direction corresponding to the optical axis, which changes as the stage 11 moves along the optical axis, is indicated along the horizontal axis in FIG. 10. Graph I in FIG. 10 represents the focal point detection signal VM used to set the focus position of the autofocusing slit image exactly at the focus position of the first objective lens 12. For instance, if the focal point of the first objective lens 12 is to be adjusted at the specimen surface 14b through the autofocus control, a value which will set the output SA−SB to 0 when the specimen surface 14b is on the focal point of the first objective lens 12 should be selected for the middle point t1 of the CCD sensor 30. By adopting these measures, the first objective lens 12 can be kept focused on the specimen surface 14b through the autofocus control at all times.

As described above, the stage drive unit 34 includes the stage drive DC motor 34a mounted at the stage 11 and the stage drive motor driver 34b that rotates the stage drive DC motor 34a. The stage drive unit 34 further includes a rotary encoder that detects the rotational angle of the stage drive DC motor 34a and an up/down counter that counts the vertical movement of the stage 11 based upon the results of the detection executed by the rotary encoder.

The CPU 41 calculates the control signal used in the autofocus control as explained earlier and outputs the control signal thus calculated as a vertical movement control signal and a speed control signal to the stage drive motor driver 34b. In response to these signals, the stage drive motor driver 34b drives the stage drive DC motor 34a. The results of the stage movement count executed by the up/down counter are output to the CPU 41 as a vertical movement position signal.

As the stage drive DC motor 34a rotates, the stage 11 moves up/down along the optical axis in conformance to the rotational angle of the stage drive DC motor. Thus, the specimen 18 placed on the stage 11, too, moves up/down together with the cover glass 14 and the slide glass 15, and the positional relationship between the specimen 18 and the first objective lens 12 is adjusted. The stage drive unit 34 also includes a limit sensor. The limit sensor, which detects the limit point of the vertical movement of the stage 11, is utilized to prevent any contact between the first objective lens 12 and the cover glass 14.

While a single first objective lens 12 is shown in FIG. 1, the microscope in the embodiment is actually provided with a plurality of first objective lenses 12 with varying magnifying powers to allow the user to select the objective lens with a desired magnifying power. The plurality of first objective lenses 12 are mounted at the motorized nosepiece which is rotationally driven by the motorized nosepiece drive unit 35. The motorized nosepiece drive unit 35 includes an motorized nosepiece drive DC motor used to drive the motorized nosepiece, which is mounted at the motorized nosepiece and an motorized nosepiece drive motor driver that rotates the motorized nosepiece drive DC motor based upon a rotation control signal provided by the CPU 41. The motorized nosepiece is caused to rotate as the motorized nosepiece drive DC motor rotates. As the motorized nosepiece rotates, the plurality of first objective lenses 12 also rotate until one of the first objective lenses 12 is positioned on the observation optical path of the microscope. The motorized nosepiece drive unit 35 further includes a sensor that detects the number (1 through 6) assigned to a nosepiece hole positioned on the observation optical path of the microscope among nosepiece holes (e.g., 6 nosepiece holes) at the motorized nosepiece.

The input unit 43 is now explained. As described earlier, the input unit 43 includes the focus position adjustment operation switch and the focus position adjustment lens changeover switch. In addition, the input unit 43 includes a keyboard, an objective lens changeover switch, an autofocus control start switch, a focus matching position storage switch, an up/down fine adjustment switch and the like.

The keyboard is used to enter information related to the first objective lens 12. The data related to the first objective lens 12 entered through the keyboard are stored into the memory 42. In addition, the focus matching position information obtained through operation of the focus matching position storage switch, too, is stored into the memory 42.

The objective lens changeover switch is used to select a first objective lens other than the first objective lens 12 currently positioned on the observation optical path of the microscope. The CPU 41 controls the motorized nosepiece drive unit 35 based upon a changeover signal input through the objective lens changeover switch and positions the revolver hole specified by the changeover signal onto the observation optical path of the microscope.

The autofocus control start switch is used to issue an instruction to start the autofocus control by the autofocus system. In response to an operation of the autofocus control start switch, the CPU 41 executes the slit projection-type autofocus control to position the specimen 18 at the focal point of the first objective lens 12 as explained earlier.

The up/down fine adjustment switch is used to fine-adjust the vertical movement of the stage 11 through a manual operation. The CPU 41 drives the stage drive unit 34 based upon a fine adjustment signal input through the up/down fine adjustment switch to move the stage 11 along the optical axis. The operator operates the up/down fine adjustment switch while observing the image of the specimen 18 via the eyepiece second objective lens 13 and the eyepiece lens at the microscope. The operator ends the operation of the up/down fine adjustment switch when he observes a clear high-contrast image. As a result, the stage 11 becomes positioned. At this point, a given plane within the specimen 18 is set exactly at the focal plane of the first objective lens 12 in the microscope achieved in the embodiment.

When a desired position of the specimen 18 is set exactly at the focus position of the first objective lens 12 with the up/down fine adjustment switch, the focus position must be manually adjusted as described above every time the specimen is replaced with another specimen or every time the first objective lens 12 is exchanged. In the embodiment, by using the focus position adjustment lens 8 the focus position of the first objective lens 12 can be set exactly at a desired point of the specimen 18 while implementing the autofocus control.

Now, a detailed explanation is given on the autofocus control executed as the focus position adjustment lens 8 is operated.

As the autofocusing slit image is formed at a position indicated by the point P' in FIG. 9A by moving the concave lens 8b of the focus position adjustment lens 8 rearward, i.e., moving the concave lens 8b further away from the convex lens 8a, an image of a reflection of the slit image is formed at a position indicated by the point Q in FIG. 9B. It is to be noted that the point P' is set away from the specimen surface 14b by a distance equal to the distance of the point P that the user wishes to observe from the specimen surface 14b along the optical axis. The point P' and the point P are present on the opposite sides of each other relative to the specimen surface 14b. The detection signals obtained at the CCD sensor 30 in the state shown in FIG. 9B are represented by the one-point chain line P in FIG. 6. In addition, the relationship between the focal point detection signal VM obtained in this state and the position of the reflected slit image along the optical axis resulting from the movement of the stage 11 along the optical axis is indicated by Graph IV in FIG. 10.

As the autofocus control starts in this condition, the stage drive DC motor 34a is driven in conformance to the reflected image signals detected by the autofocusing CCD sensor 30 to move the stage 11 up/down along the optical axis, as described earlier. In the state illustrated in FIG. 9A, the image of the reflection of the autofocusing slit image is formed at the point Q further rearward relative to the autofocusing CCD sensor 30, as shown in FIG. 9B. Accordingly, the stage 11 moves upward to move closer to the first objective lens 12. As a result, the control is implemented so as to set the focal point a of the autofocusing slit image exactly at the specimen surface 14b, as shown in FIG. 2C, and to set the focal point f of the first objective lens 12 exactly at the point P inside the specimen 18 shown in FIG. 9A.

Since the focus position adjustment lens 8 shifts the image forming position of the autofocusing slit image along the optical axis, the graph indicating the relationship between the focal point detection signal VM and the position of the reflected slit image along the optical axis is shifted relative to the position of the reflected image along the optical axis, i.e., along the horizontal axis. Thus, since it is ensured that the focal point detection signal VM is always available regardless of the quantity of light from the reflected autofocusing slit image, the focus position of the first objective lens 12 can be offset or separated from the image forming position of the slit image while executing the autofocus control.

As explained in detail above, the focus position adjustment lens 8 is caused to move along the optical axis from the offset zero position shown in FIG. 2A while executing the autofocus control. As a result, the focus position of the first objective lens 12 can be freely shifted to a desired position regardless of the quantity of light from the reflected autofocusing slit image at the specimen surface 14b. In addition, the focal point of the first objective lens 12 can be adjusted to remain at a position which is set apart from the specimen surface 14b over a predetermined distance at all times by moving the focus position adjustment lens 8. Thus, the procedural steps for observing another portion of the specimen 18 by moving the specimen 18 on the stage 11 or for observing another specimen can be executed with a high degree of efficiency.

It is to be noted that the focus position adjustment lens 8 is caused to move in response to an operation of the focus position adjustment operation switch in the embodiment described above. Namely, the distance x over which the focus position adjustment lens 8 is caused to move is set in advance, and the focus position adjustment lens 8 is caused to move over the distance x along the optical axis in response to an operation of the focus position adjustment operation switch. However, the focus position adjustment lens 8 may be manually moved instead. In addition, while interchangeable focus position adjustment lenses 8 are used so as to vary the extent to which the focus position is offset or sifted, i.e., so as to vary the offset quantity OS, a single unit of focus position adjustment lens 8 may be used, thereby keeping the offset quantity OS at a fixed value. By using a single unit of focus position adjustment lens 8, the structure required to achieve the focus position adjustment can be simplified and accordingly, the control system, too, can be simplified. As a result, a more compact autofocus system can be realized, which allows the production cost to be lowered.

Furthermore, while the stage 11 is caused to move up/down along the optical axis by the stage drive unit 34 which is a focus actuator in order to set the specimen 18 at the focal point of the first objective lens 12 in the embodiment as explained above, an alternative structure having a fixed stage 11 and the observation optical system 3 which includes the first objective lens 12 caused to move up/down along the optical axis may instead be adopted.

The above described embodiment is an example, and various modifications can be made without departing from the spirit and scope of the invention.

What is claimed is:

1. An autofocus system comprising:
    a light source;
    a focusing illumination optical system that forms an optical image generated with light from the light source on a target object through an objective lens;
    a focusing image forming optical system that receives through the objective lens reflected light generated as the optical image is reflected off the target object and forms a reflected image of the optical image;
    a photoelectric converter that is provided at an image forming position at which the reflected image is formed by the focusing image forming optical system to detect the reflected image;
    a signal output device that outputs a signal for controlling a focus actuator based upon a signal corresponding to the reflected image obtained at the photoelectric converter; and
    an image forming position adjustment device that adjusts an offset quantity between a focus position of the objective lens and an image forming position of the optical image by moving at least one of the image forming position of the optical image or the image forming position of the reflected image along an optical axis, wherein
    the image forming position adjustment device receives light that originated from the light source and comprises a convex lens and a concave lens,
    the distance between the convex and concave lenses is adjustable, and
    the image forming position adjustment device is provided on a parallel light flux shared by the focusing illumination optical system and the focusing image forming optical system to move the image forming position of the optical image and the image forming position of the reflected image along the optical axis.

2. An autofocus system according to claim 1, wherein:
    the focusing illumination optical system includes a slit plate having a slit formed therein; and
    the light from the light source travels through the slit plate to form the optical image in a slit shape.

3. An autofocus system according to claim 1, wherein:
    the image forming position adjustment device includes an adjustment lens provided on the parallel light flux shared by the focusing illumination optical system and the focusing image forming optical system;
    the image forming position adjustment device includes a lens position adjustment unit that adjusts a position of the adjustment lens along the optical axis of the focusing illumination optical system and the focusing image forming optical system; and the adjustment lens includes the convex lens and the concave lens, with one of the convex lens and the concave lens fixed on the optical axis of the focusing illumination optical system and the focusing image forming optical system and the other lens allowed to move along the optical axis of the focusing illumination optical system and the focusing image forming optical system.

4. An autofocus system according to claim 1, wherein:

the image forming position adjustment device includes an adjustment lens provided on the parallel light flux shared by the focusing illumination optical system and the focusing image forming optical system, and the image forming position adjustment device further includes a lens exchange unit that exchanges adjustment lenses.

5. A microscope comprising:

an autofocus system according to claim 1 and an observation optical system that includes the objective lens.

6. An autofocus system comprising:

a light source;

a focusing illumination optical system that forms an optical image generated with light from the light source on a target object through an objective lens;

a focusing image forming optical system that receives through the objective lens reflected light generated as the optical image is reflected off the target object and forms a reflected image of the optical image;

a photoelectric converter that is provided at an image forming position at which the reflected image is formed by the focusing image forming optical system to detect the reflected image;

a signal output device that outputs a signal for controlling a focus actuator based upon a signal corresponding to the reflected image obtained at the photoelectric converter; and an image forming position adjustment device that adjusts an offset quantity between a focus position of the objective lens and an image forming position of the optical image by moving at least one of the image forming position of the optical image or the image forming position of the reflected image along an optical axis, wherein the image forming position adjustment device receives light that originated from the light source and comprises a convex lens and a concave lens, the distance between the convex and concave lenses is adjustable, and the image forming position adjustment device is provided on a parallel light flux of the focusing illumination optical system to move the image forming position of the optical image along the optical axis.

7. An autofocus system according to claim 6, wherein:

the image forming position adjustment lens device includes an adjustment lens provided on the parallel light flux of the focusing illumination optical system;

the image forming position adjustment device includes a lens position adjustment unit that adjusts the position of the adjustment lens along the optical axis of the focusing illumination optical system; and the adjustment lens includes the convex lens and the concave lens, with one of the convex lens and the concave lens fixed on the optical axis of the focusing illumination optical system and the other lens allowed to move along the optical axis of the focusing illumination optical system.

8. An autofocus system according to claim 6, wherein:

the image forming position adjustment lens device includes an adjustment lens provided on the parallel light flux of the focusing illumination optical system, and the image forming position adjustment device further includes a lens exchange unit that exchanges adjustment lenses.

9. An autofocus system comprising:

a light source;

a focusing illumination optical system that forms an optical image generated with light from the light source on a target object through an objective lens;

a focusing image forming optical system that receives through the objective lens reflected light generated as the optical image is reflected off the target object and forms a reflected image of the optical image;

a photoelectric converter that is provided at an image forming position at which the reflected image is formed by the focusing image forming optical system to detect the reflected image;

a signal output device that outputs a signal for controlling a focus actuator based upon a signal corresponding to the reflected image obtained at the photoelectric converter; and an image forming position adjustment device that adjusts an offset quantity between a focus position of the objective lens and an image forming position of the optical image by moving at least one of the image forming position of the optical image or the image forming position of the reflected image along an optical axis, wherein the image forming position adjustment device receives light that originated from the light source and comprises a convex lens and a concave lens, the distance between the convex and concave lenses is adjustable, and the image forming position adjustment device is provided on a parallel light flux of the focusing image forming optical system to move the image forming position of the reflected image along the optical axis.

10. An autofocus system according to claim 9, wherein:

the image forming position adjustment device includes an adjustment lens provided on the parallel light flux of the focusing image forming optical system;

the image forming position adjustment device includes a lens position adjustment unit that adjusts the position of the adjustment lens along the optical axis of the focusing image forming optical system; and the adjustment lens includes the convex lens and the concave lens, with one of the convex lens and the concave lens fixed on the optical axis of the focusing image forming optical system and the other lens allowed to move along the optical axis of the focusing image forming optical system.

11. An autofocus system according to claim 9, wherein:

the image forming position adjustment device includes an adjustment lens provided on the parallel light flux of the focusing image forming optical system, and the image forming position adjustment device further includes a lens exchange unit that exchanges adjustment lenses.

* * * * *